US011831814B2

(12) United States Patent
Lebeau et al.

(10) Patent No.: US 11,831,814 B2
(45) Date of Patent: Nov. 28, 2023

(54) PARALLEL VIDEO CALL AND ARTIFICIAL REALITY SPACES

(71) Applicant: Meta Platforms Technologies, LLC, Menlo Park, CA (US)

(72) Inventors: Michael James Lebeau, London (GB); Björn Wanbo, London (GB); Fábio Resende, San Francisco, CA (US); Mark Rabkin, Palo Alto, CA (US); Vesa Petteri Rantanen, London (GB)

(73) Assignee: Meta Platforms Technologies, LLC, Menlo Park, CA (US)

( * ) Notice: Subject to any disclaimer, the term of this patent is extended or adjusted under 35 U.S.C. 154(b) by 7 days.

(21) Appl. No.: 17/466,528

(22) Filed: Sep. 3, 2021

(65) Prior Publication Data

US 2023/0071584 A1 Mar. 9, 2023

(51) Int. Cl.
*G06F 3/048* (2013.01)
*H04N 7/15* (2006.01)
(Continued)

(52) U.S. Cl.
CPC ......... *H04N 7/157* (2013.01); *G06Q 10/1093* (2013.01); *H04L 12/1818* (2013.01); *H04L 12/1822* (2013.01)

(58) Field of Classification Search
CPC ............... H04N 7/157; G06Q 10/1093; H04L 12/1818; H04L 12/1822
See application file for complete search history.

(56) References Cited

U.S. PATENT DOCUMENTS 6,559,863 B1 * 5/2003 Megiddo .................. H04N 7/15 348/E7.083
8,537,196 B2 * 9/2013 Hegde .................... H04N 7/157 348/14.09
(Continued)

FOREIGN PATENT DOCUMENTS

CA 3039347 A1 * 4/2018 ......... G02B 27/0093
WO 2020117657 A1 6/2020

OTHER PUBLICATIONS

Jikadra et al., Video Calling with Augmented Reality Using WebRTC API, 2019, IEEE, 5 pages.*
(Continued)

*Primary Examiner* — Linh K Pham
(74) *Attorney, Agent, or Firm* — Potomac Law Group, PLLC

(57) ABSTRACT

Aspects of the present disclosure are directed to a VC/XR connection system that can establish and administer an XR space for a video call. The VC/XR connection system allows users to easily transition from a typical video call experience to the XR space, simply by putting on her artificial reality device. The VC/XR connection system can identify calendared video call events, establish corresponding XR spaces, and create a link between the video call and the XR space. Invitees to the video call that don an artificial reality device can be automatically taken into the XR space. The XR space can A) connect to the video call as a call participant, allowing the video call participants to see into the XR space and B) show a feed of the video call in the XR space, allowing users in the XR space to see the video call participants.

19 Claims, 13 Drawing Sheets

950
954
960
952
968
962
956
958
964

(51) Int. Cl.
*G06Q 10/1093* (2023.01)
*H04L 12/18* (2006.01)

(56) References Cited

U.S. PATENT DOCUMENTS 8,581,958 B2 * 11/2013 Baker .................... H04N 7/152 348/14.09
8,675,067 B2 * 3/2014 Chou .................... H04N 7/147 348/149
9,338,404 B1 * 5/2016 Egeler .................... H04N 7/157
9,401,095 B2 * 7/2016 Kubota ............... H04L 65/1069
9,841,814 B1 12/2017 Kallmeyer et al.
9,959,676 B2 * 5/2018 Barzuza ................ H04L 67/131
10,182,210 B1 * 1/2019 Goetzinger, Jr. ..... H04L 65/403
10,298,587 B2 5/2019 Hook et al.
10,311,383 B2 * 6/2019 Holmes ................ G06Q 10/109
10,403,050 B1 * 9/2019 Beall ....................... G06T 7/292
10,499,033 B2 12/2019 Pesonen
10,554,931 B1 2/2020 Zavesky et al.
10,582,191 B1 3/2020 Marchak, Jr. et al.
10,664,772 B1 * 5/2020 Poel .................... G06F 3/04842
10,701,318 B2 * 6/2020 Valli ...................... H04N 7/157
10,917,613 B1 * 2/2021 Chiarella ............... H04N 7/157
10,952,006 B1 * 3/2021 Krol ........................ G06F 3/165
11,140,361 B1 * 10/2021 Krol ........................ G06F 3/011
11,302,085 B2 * 4/2022 LeBeau ................... G06F 3/147
11,394,925 B1 * 7/2022 Faulkner ............... H04L 65/403
11,456,887 B1 * 9/2022 McCracken ........... H04N 7/157
11,528,312 B2 * 12/2022 Oyman ............... H04L 65/1016
11,563,779 B2 * 1/2023 Copley ............... H04L 65/1066
2002/0158873 A1 10/2002 Williamson
2007/0279484 A1 * 12/2007 Derocher ................. H04N 7/15 348/E7.083
2009/0288007 A1 * 11/2009 Leacock ................. H04L 51/04 715/757
2010/0085416 A1 * 4/2010 Hegde .................... H04N 7/157 348/E7.083
2011/0107270 A1 5/2011 Wang et al.
2012/0192088 A1 7/2012 Sauriol et al.
2012/0204118 A1 * 8/2012 Lefar .................. G06F 3/04883 715/756
2012/0246582 A1 * 9/2012 Leacock ............... H04L 51/043 715/753
2013/0024785 A1 * 1/2013 Van Wie ................. H04L 65/75 715/753
2014/0085316 A1 * 3/2014 Narayanan ............. H04N 7/157 345/501
2014/0085406 A1 * 3/2014 Narayanan .......... H04L 65/4046 348/14.09
2014/0096036 A1 * 4/2014 Mohler .................. G06Q 10/10 715/753
2015/0215581 A1 * 7/2015 Barzuza .............. H04L 65/4038 348/14.1
2015/0271220 A1 * 9/2015 Kleiner ................ G06Q 10/101 709/204
2015/0279044 A1 10/2015 Kim et al.
2016/0050394 A1 * 2/2016 Segal .................. H04L 12/1822 348/14.08
2016/0093108 A1 * 3/2016 Mao ..................... G02B 27/017 345/633
2016/0132221 A1 5/2016 Lasser et al.
2016/0155187 A1 * 6/2016 Paulrajan ........... G06Q 30/0643 705/27.2
2016/0163070 A1 * 6/2016 Leacock ............... G06F 16/444 715/758
2016/0353062 A1 * 12/2016 Ono ..................... G06V 40/172
2017/0257405 A1 9/2017 Lo et al.
2017/0357917 A1 * 12/2017 Holmes .............. G06Q 10/1093
2018/0063480 A1 * 3/2018 Luks ..................... G06F 3/0484
2018/0095635 A1 * 4/2018 Valdivia .................... G06F 3/02
2018/0098059 A1 * 4/2018 Valdivia ................ H04L 67/131
2018/0101989 A1 4/2018 Frueh et al.
2018/0139246 A1 * 5/2018 Rosenberg ......... G06Q 10/1095
2018/0144212 A1 5/2018 Burgos et al.
2018/0158246 A1 6/2018 Grau et al.
2018/0227138 A1 * 8/2018 Faulkner ............. H04L 12/1831
2018/0234671 A1 8/2018 Yang et al.
2018/0356885 A1 * 12/2018 Ross .................... G06Q 10/101
2019/0045157 A1 2/2019 Venshtain et al.
2019/0058870 A1 2/2019 Rowell et al.
2019/0253667 A1 * 8/2019 Valli .................... H04N 13/243
2019/0279424 A1 9/2019 Clausen et al.
2019/0310757 A1 * 10/2019 Lee ......................... G06F 3/017
2019/0325658 A1 * 10/2019 Park .......................... G06T 7/70
2019/0327392 A1 * 10/2019 Sarkar ................... A63F 13/335
2019/0346522 A1 11/2019 Botnar et al.
2019/0371060 A1 * 12/2019 Energin ................ G06T 19/006
2020/0090350 A1 3/2020 Cho et al.
2020/0099891 A1 * 3/2020 Valli ...................... H04N 7/157
2020/0118342 A1 4/2020 Varshney et al.
2020/0142475 A1 5/2020 Paez et al.
2020/0154166 A1 5/2020 Rakshit et al.
2020/0279411 A1 9/2020 Atria et al.
2020/0296327 A1 9/2020 Karafin et al.
2020/0329214 A1 * 10/2020 Ahn ........................ G06F 3/017
2020/0371665 A1 11/2020 Clausen et al.
2020/0396266 A1 * 12/2020 Goel ................... H04L 65/1066
2021/0019541 A1 1/2021 Wang et al.
2021/0029326 A1 * 1/2021 Oyman .................... H04N 7/15
2021/0120066 A1 * 4/2021 Oyman .................. H04L 67/14
2021/0248727 A1 8/2021 Fisher et al.
2021/0263593 A1 8/2021 Lacey
2021/0281802 A1 * 9/2021 Kirisken .............. G02B 27/017
2021/0336784 A1 * 10/2021 Athlur ................. H04L 63/0442
2021/0390767 A1 12/2021 Johnson et al.
2021/0392175 A1 * 12/2021 Gronau ................. H04L 65/403
2021/0392296 A1 * 12/2021 Rabinovich ............. G06T 17/20
2021/0407520 A1 * 12/2021 Neckermann ....... H04L 12/1831
2022/0084288 A1 * 3/2022 LeBeau ................. H04L 63/107
2022/0086167 A1 * 3/2022 LeBeau ................... G06F 3/147
2022/0086205 A1 * 3/2022 LeBeau ................. G06F 3/0219
2022/0103386 A1 * 3/2022 Jensen ................ H04L 12/1818
2022/0109810 A1 4/2022 Kancharlawar et al.
2022/0116431 A1 * 4/2022 Mayfield ................. H04L 67/01
2022/0150083 A1 * 5/2022 Faulkner ................ H04N 7/152
2022/0157342 A1 * 5/2022 Kliushkin ............ G11B 27/036
2022/0172444 A1 * 6/2022 Lebeau ................. G06F 3/1423
2022/0174108 A1 * 6/2022 Oyman ............. H04N 21/2343
2022/0200979 A1 * 6/2022 Wenzel ................. H04L 63/083
2022/0229535 A1 * 7/2022 Evangelista ........... H04N 7/147
2022/0385490 A1 * 12/2022 Lin ......................... H04L 63/10
2022/0417308 A1 * 12/2022 Oyman ................. H04L 65/762
2023/0082461 A1 * 3/2023 Gal ..................... H04L 12/1831

OTHER PUBLICATIONS

Shanmugam et la., Research opportunities on virtual reality and augmented reality: a survey, 2019, IEEE, 6 pages.*
Gupta K., et al., “Do You See What I See? The Effect of Gaze Tracking on Task Space Remote Collaboration,” IEEE Transactions on Visualization and Computer Graphics, Nov. 2016, vol. 22, No. 11, pp. 2413-2422, DOI: 10.1109/TVCG.2016.2593778.
Unknown., “A Better Way to Meet Online,” Gather, https://www.gather.town/ , Last Accessed Oct. 11, 2021.
International Search Report and Written Opinion for International Application No. PCT/US2021/038992, dated Oct. 29, 2021, 16 pages.

* cited by examiner

PARALLEL VIDEO CALL AND ARTIFICIAL REALITY SPACES

TECHNICAL FIELD

The present disclosure is directed to establishing and administering an XR space as a parallel platform for a video call.

BACKGROUND

Video conferencing has become a major way people connect. From work calls to virtual happy hours, webinars to online theater, people feel more connected when they can see other participants, bringing them closer to an in-person experience. Such video calls, however, remain a pale imitation of face-to-face interactions. Understanding body language and context can be difficult with only a two-dimensional ("2D") representation of a sender. Further, communication often relies on interpersonal interactions, such as spatial movements between participants. Yet communication over video calling does not provide the ability for participants to move relative to each other, as the point of view is fixed to the sender's camera. In addition, the limitation of video calling on a flat panel display introduces an intrusive layer of technology that can distract from communication and diminishes the perception of in-person communication. While some artificial reality devices are available through which users can join a shared space and interact via avatars, not all users who wish to connect will have access to such a device. Thus, users of existing systems are forced to choose between A) the inferior communications yet greater availability of video calling and B) more in-depth communications through artificial reality devices but with limited participants.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
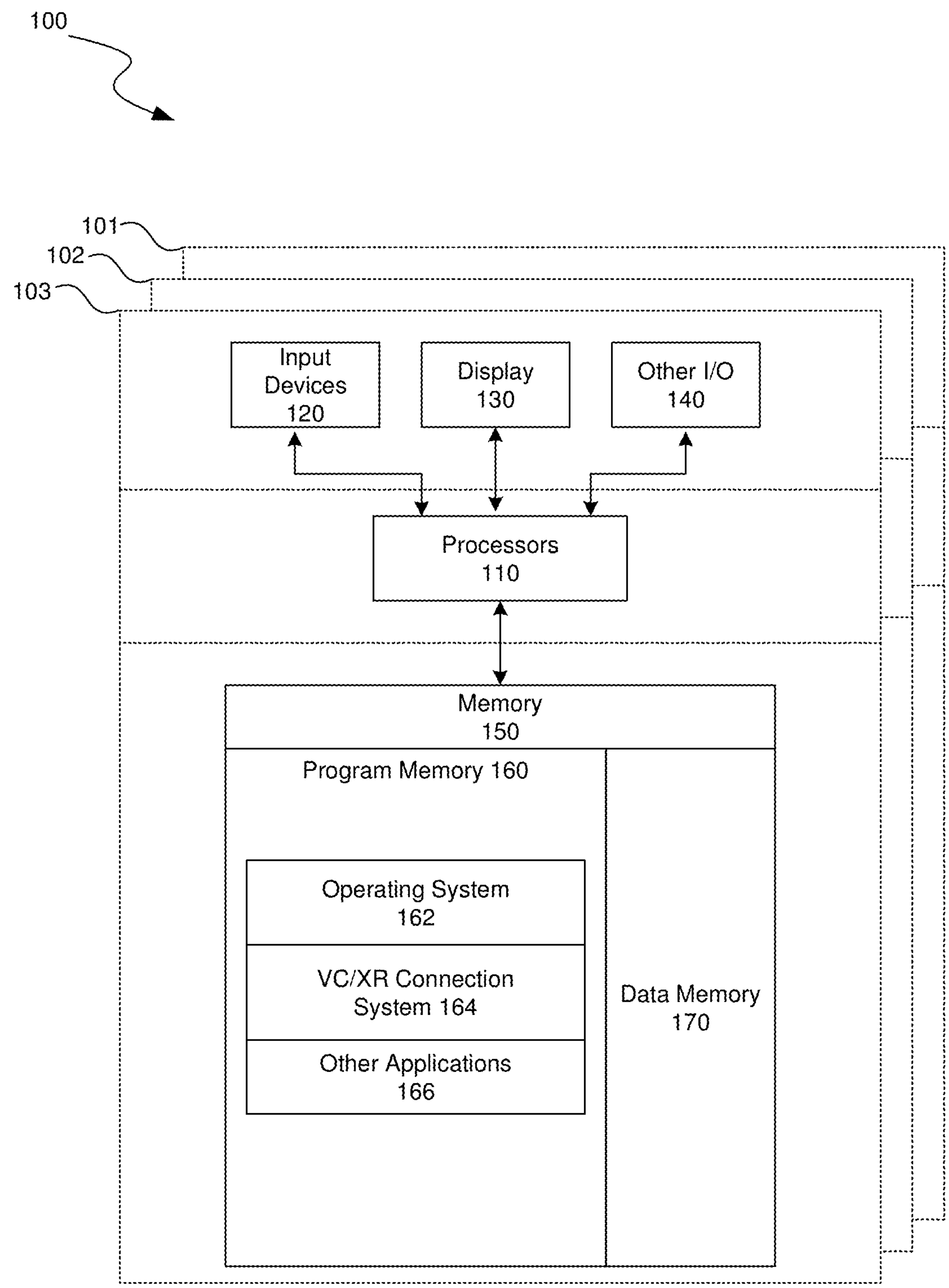
FIG. 1 is a block diagram illustrating an overview of devices on which some implementations of the present technology can operate.

Aspects of the present disclosure are directed to a video call/artificial reality (VC/XR) connection system that can establish and administer an artificial reality (XR) space as a parallel platform for joining a video call. By establishing an XR space connected to the video call, the VC/XR connection system allows users to easily transition from a typical video call experience to an artificial reality environment connected to the video call, simply by putting on her artificial reality device. Such an XR space can connect to the video call as a call participant, allowing users not participating through the XR space (referred to herein as "video call users" or "video call participants") to see into the XR space e.g., as if it were a conference room connected to the video call. The video call users can then see how such an XR space facilitates more in-depth communication, prompting them to don their own artificial reality devices to join the XR space.

The VC/XR connection system can accomplish this by first identifying an established video call event. This can include the VC/XR connection system accessing a calendar of a user (e.g., via credentials or other access rights provided by the user) and identifying the scheduled events that include a link to a video call. Notably, this can be done for events with links to video calls from multiple different platforms. In some implementations, a user can manually select calendar events (either with or without a video call link) for creation of a parallel XR space. The VC/XR connection system can establish an XR space for each such automatically or manually selected event. Creating the XR space can include establishing parameters for the XR space based on a context of the selected event, such as selecting a size (e.g., based on the number of video call invitees), a room layout (e.g., based on user selections or whether the event has presentation materials), creating a connection mechanism for the VC/XR connection system to link the video call to the XR space (e.g., an API call or adding the VC/XR connection system as an event invitee), initializing the XR space upon the start time of the video call, etc.

When the video call begins, the VC/XR connection system can connect to the system providing the video call, such as by making a call to an API provided by the video calling system or by accessing a link provided to invitees of the video call (which may include a process to add the VC/XR connection system as an invitee). The VC/XR connection system can then provide a view from one or more virtual cameras, added to the XR space, as the feed it uses to connect to the video call. Participants in the video call can thus see one or more views into the XR space as participants in the video call. Further, the VC/XR connection system can take one or more feeds from the video call and display it/them in the XR space. For example, the VC/XR connection system can get one feed showing the display that a participant in the video call would see or the VC/XR connection system can segment such a feed to get individual views of the video call participants. The single feed can be presented in the XR space (e.g., as a large display—such as on a wall) or the multiple feeds can be positioned in various places in the XR space (such as in positions relative to chairs around a conference table in the XR space).

When a user puts on an artificial reality device, the VC/XR connection system can determine, based on the invitees specified in the automatically or manually selected events, whether the user is an invitee to a video call that A) is active and B) for which there is an XR space. If so, the VC/XR connection system can automatically, or provide a notification to easily, add the user to the XR space for the video call. Where the user is moving from being a video call participant to being a participant in the XR space, the user's feed from the video call can be replaced with her avatar in the XR space. Thus, the VC/XR connection system allows users to easily set up XR spaces corresponding to video call and provides an extremely low barrier for accessing an XR space created for a video call.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

There are a number of existing video calling systems that allow users to communicate through live 2D displays. There are also existing artificial reality systems that allow users to connect in an artificial reality environment—such as through a virtual reality conference room or a holographic call. However, there is almost no integration between these two types of systems, and any such integrations that do exist are very difficult to set up and administer. The VC/XR connection system described herein is expected to overcome these deficiencies in existing systems with features such as: automated identification of video calling events for linking to an XR space; pre-provisioning of an XR space for use with a video call, including XR space set up and video call modification to link with the XR space; and automatic identification of XR users associated with an upcoming or ongoing video call for automatic entry into the XR space. Automatic set up of an XR space, with a link between the XR space and the video call, removes otherwise needed interactions, thereby freeing resources for other tasks. Further the various automated features of the VC/XR connection system allow users, who would otherwise not have the ability to create and use XR spaces for video calls, to easily and quickly set these up and enter them. In addition, the pre-processing for creating and loading XR spaces reduces workload and improves performance when a user begins working with an artificial reality device.

Several implementations are discussed below in more detail in reference to the figures. FIG. 1 is a block diagram illustrating an overview of devices on which some implementations of the disclosed technology can operate. The devices can comprise hardware components of a computing system 100 that can establish and administer an XR space as a parallel platform for joining a video call. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, VC/XR connection system 164, and other application programs 166. Memory 150 can also include data memory 170 that can include, e.g., calendar access credentials, calendar events, domain masks for determining links as video call related, event invitee lists, artificial reality environments (e.g., XR space setups), video call feeds (and portions thereof), configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
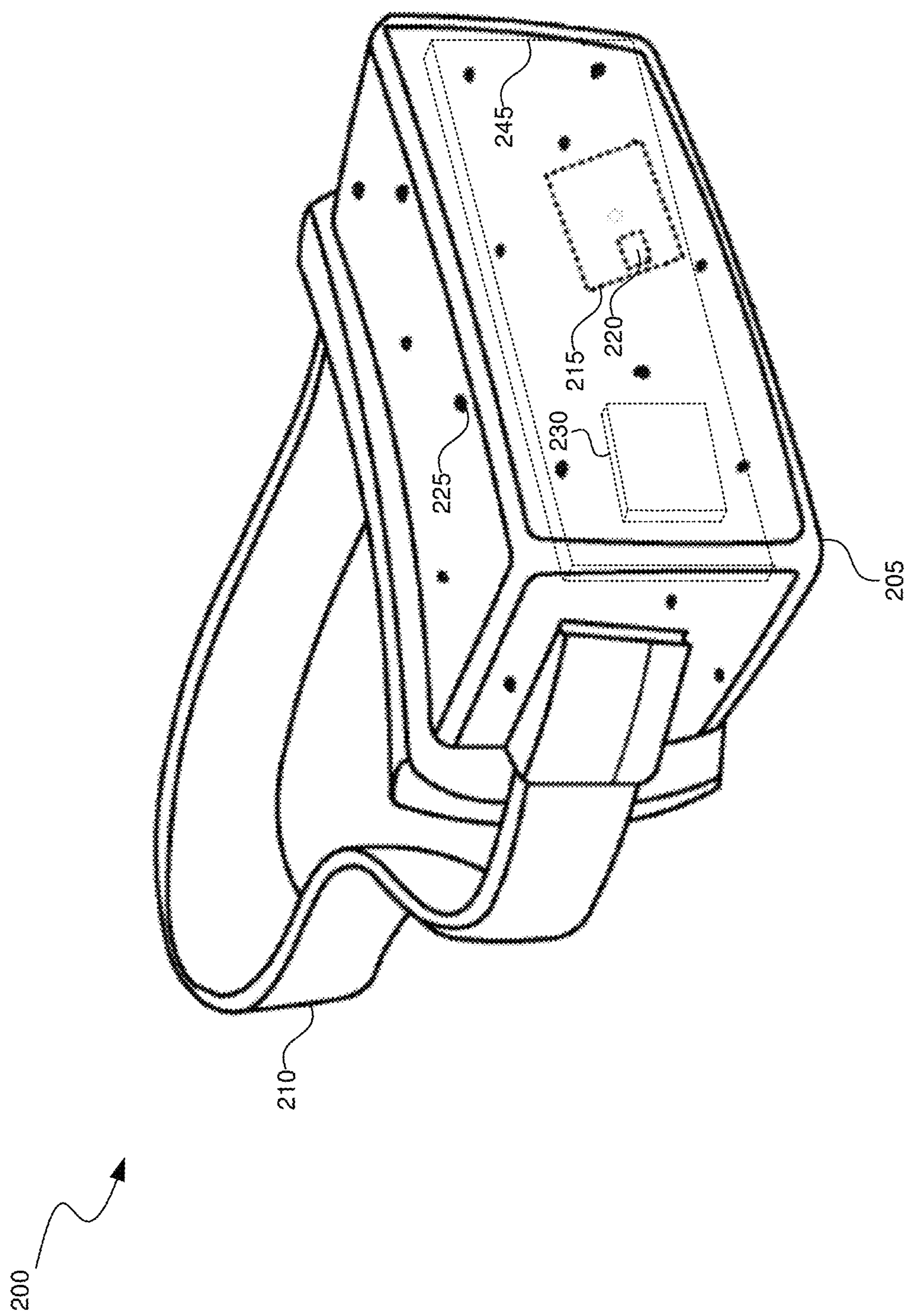
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
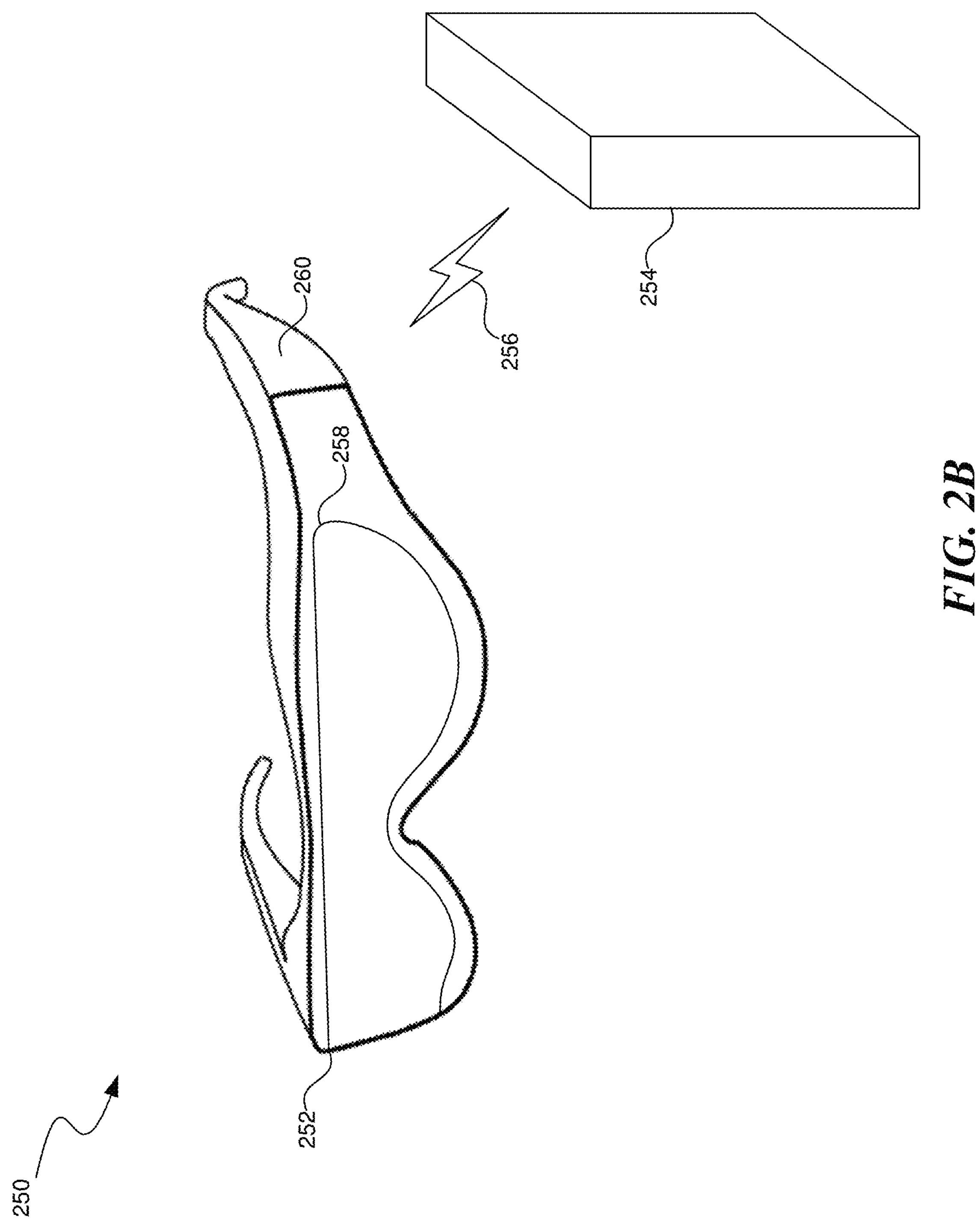
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
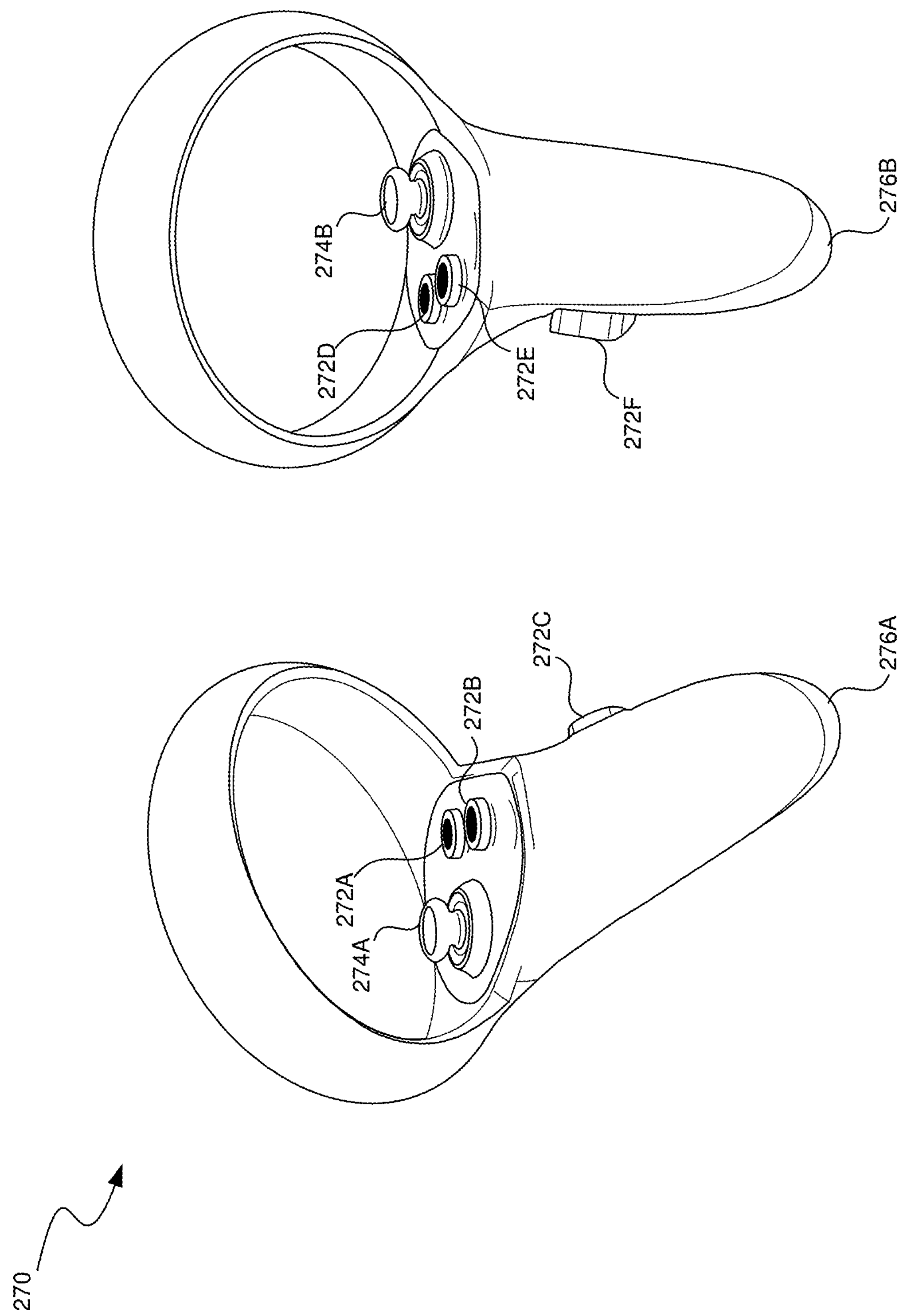
FIG. 2C is a wire diagram illustrating controllers which, in some implementations, a user can hold in one or both hands to interact with an artificial reality environment.

FIG. 2C illustrates controllers 270, which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
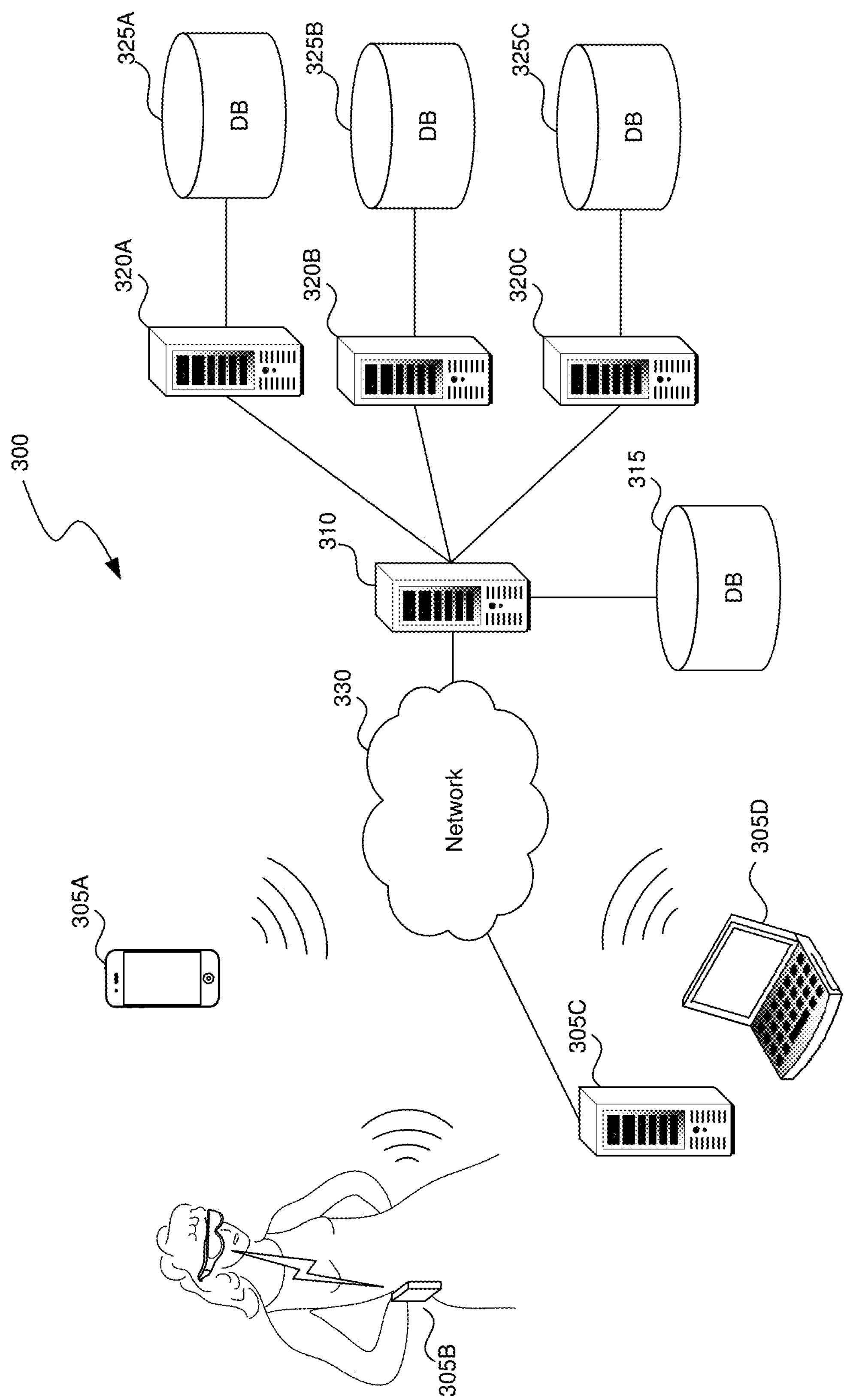
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

In some implementations, servers 310 and 320 can be used as part of a social network. The social network can maintain a social graph and perform various actions based on the social graph. A social graph can include a set of nodes (representing social networking system objects, also known as social objects) interconnected by edges (representing interactions, activity, or relatedness). A social networking system object can be a social networking system user, nonperson entity, content item, group, social networking system page, location, application, subject, concept representation or other social networking system object, e.g., a movie, a band, a book, etc. Content items can be any digital data such as text, images, audio, video, links, webpages, minutia (e.g., indicia provided from a client device such as emotion indicators, status text snippets, location indictors, etc.), or other multi-media. In various implementations, content items can be social network items or parts of social network items, such as posts, likes, mentions, news items, events, shares, comments, messages, other notifications, etc. Subjects and concepts, in the context of a social graph, comprise nodes that represent any person, place, thing, or idea.

A social networking system can enable a user to enter and display information related to the user's interests, age/date of birth, location (e.g., longitude/latitude, country, region, city, etc.), education information, life stage, relationship status, name, a model of devices typically used, languages identified as ones the user is facile with, occupation, contact information, or other demographic or biographical information in the user's profile. Any such information can be represented, in various implementations, by a node or edge between nodes in the social graph. A social networking system can enable a user to upload or create pictures, videos, documents, songs, or other content items, and can enable a user to create and schedule events. Content items can be represented, in various implementations, by a node or edge between nodes in the social graph.

A social networking system can enable a user to perform uploads or create content items, interact with content items or other users, express an interest or opinion, or perform other actions. A social networking system can provide various means to interact with non-user objects within the social networking system. Actions can be represented, in various implementations, by a node or edge between nodes in the social graph. For example, a user can form or join groups, or become a fan of a page or entity within the social networking system. In addition, a user can create, download, view, upload, link to, tag, edit, or play a social networking system object. A user can interact with social networking system objects outside of the context of the social networking system. For example, an article on a news web site might have a "like" button that users can click. In each of these instances, the interaction between the user and the object can be represented by an edge in the social graph connecting the node of the user to the node of the object. As another example, a user can use location detection functionality (such as a GPS receiver on a mobile device) to "check in" to a particular location, and an edge can connect the user's node with the location's node in the social graph.

A social networking system can provide a variety of communication channels to users. For example, a social networking system can enable a user to email, instant message, or text/SMS message, one or more other users. It can enable a user to post a message to the user's wall or profile or another user's wall or profile. It can enable a user to post a message to a group or a fan page. It can enable a user to comment on an image, wall post or other content item created or uploaded by the user or another user. And it can allow users to interact (e.g., via their personalized avatar) with objects or other avatars in an artificial reality environment, etc. In some embodiments, a user can post a status message to the user's profile indicating a current event, state of mind, thought, feeling, activity, or any other present-time relevant communication. A social networking system can enable users to communicate both within, and external to, the social networking system. For example, a first user can send a second user a message within the social networking system, an email through the social networking system, an email external to but originating from the social networking system, an instant message within the social networking system, an instant message external to but originating from the social networking system, provide voice or video messaging between users, or provide an artificial reality environment were users can communicate and interact via avatars or other digital representations of themselves. Further, a first user can comment on the profile page of a second user, or can comment on objects associated with a second user, e.g., content items uploaded by the second user.

Social networking systems enable users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection can be an edge in the social graph. Being friends or being within a threshold number of friend edges on the social graph can allow users access to more information about each other than would otherwise be available to unconnected users. For example, being friends can allow a user to view another user's profile, to see another user's friends, or to view pictures of another user. Likewise, becoming friends within a social networking system can allow a user greater access to communicate with another user, e.g., by email (internal and external to the social networking system), instant message, text message, phone, or any other communicative interface. Being friends can allow a user access to view, comment on, download, endorse or otherwise interact with another user's uploaded content items. Establishing connections, accessing user information, communicating, and interacting within the context of the social networking system can be represented by an edge between the nodes representing two social networking system users.

Figure 4:
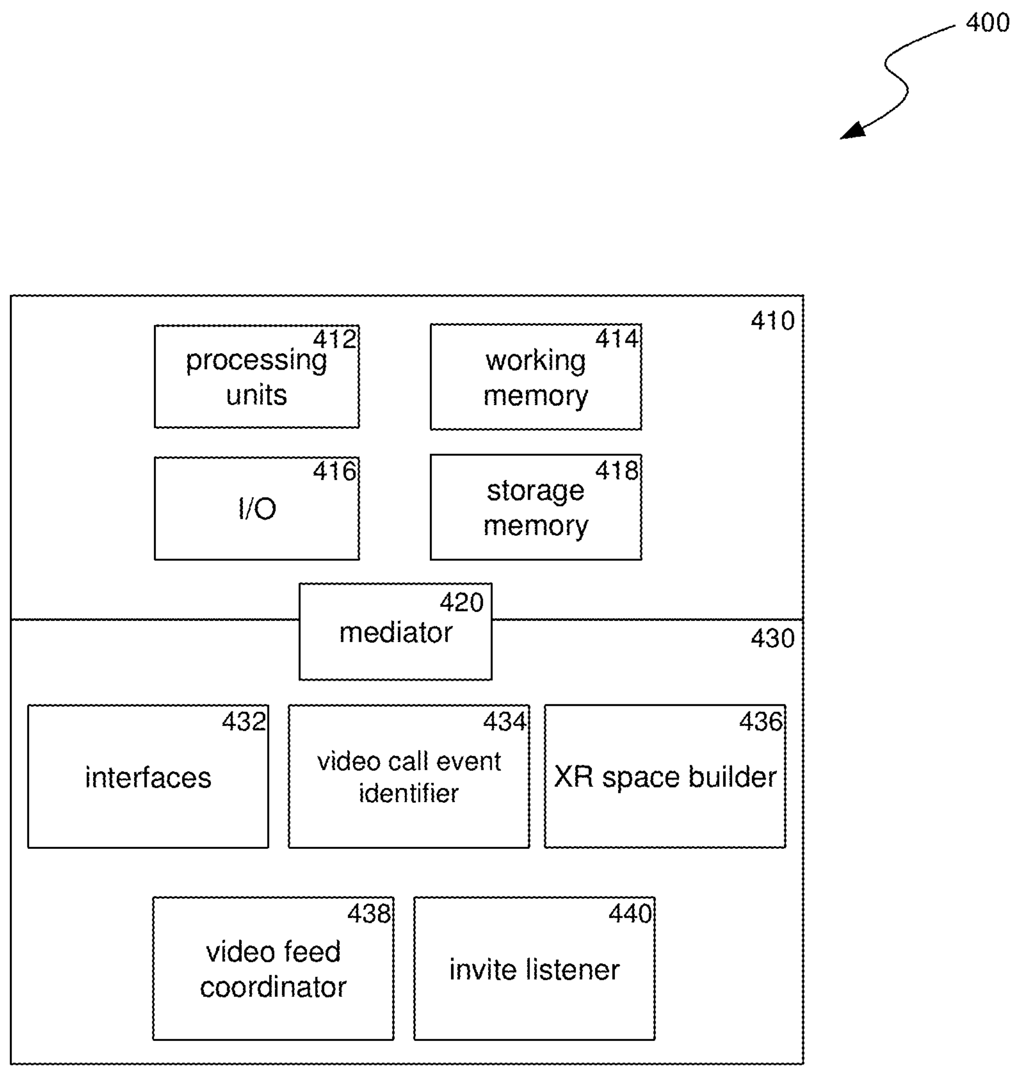
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for establishing and administering an XR space as a parallel platform for a video call. Specialized components 430 can include video call event identifier 434, XR space builder 436, video feed coordinator 438, invitee listener 440, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

Event identifier 434 can access events e.g., on a user's calendar, and identify those events that are associated with a video call. For example, the event identifier 434 can examine links embedded in events to determine whether a part of such a link, such as the domain, matches that of links set by a video calling platform. In some cases, identifying such events can be a result of a manual user selection. Additional details on identifying video calling events can be found below in relation to block 502 of FIG. 5.

XR space builder 436 can establish an XR space for video call events identified by event identifier 434. XR space builder 436 can set parameters for the XR space such as a size (e.g., based on the number of video call invitees), a room layout (e.g., based on user selections or whether the calendar event has attached presentation materials—signifying the layout should be for a presenter and viewers; or based on how the people attending are connected in a social graph—e.g., to set up a social space for connected friends or a work room/conference room for connected co-workers), and create a connection mechanism for the VC/XR connection system to link the video call to the XR space. Additional details on XR space creation can be found below in relation to block 504 of FIG. 5.

Video feed coordinator 438 can use the connection mechanism set up by XR space builder 436 to provide one or more video feeds from the XR space as one or more call participants in the video call. Video feed coordinator 438 can also use the connection mechanism set up by XR space builder 436 to show one or more video feeds from the video call in the XR space. Additional details on coordinating video feeds between the XR space and the video call can be found below in relation to blocks 506 and 508 of FIG. 5.

Invitee listener 440 can check whether a user who has put on her artificial reality device is an invitee to an upcoming or ongoing video call. If so, the invitee listener 440 can automatically add the user to the XR space set up for the video call or provide a notification of such an upcoming/ongoing event with an option to enter the XR space. Additional details on adding video call invitees, using an artificial reality device, to an XR space parallel to the video call can be found below in relation to blocks 506 and 510-514 of FIG. 5.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
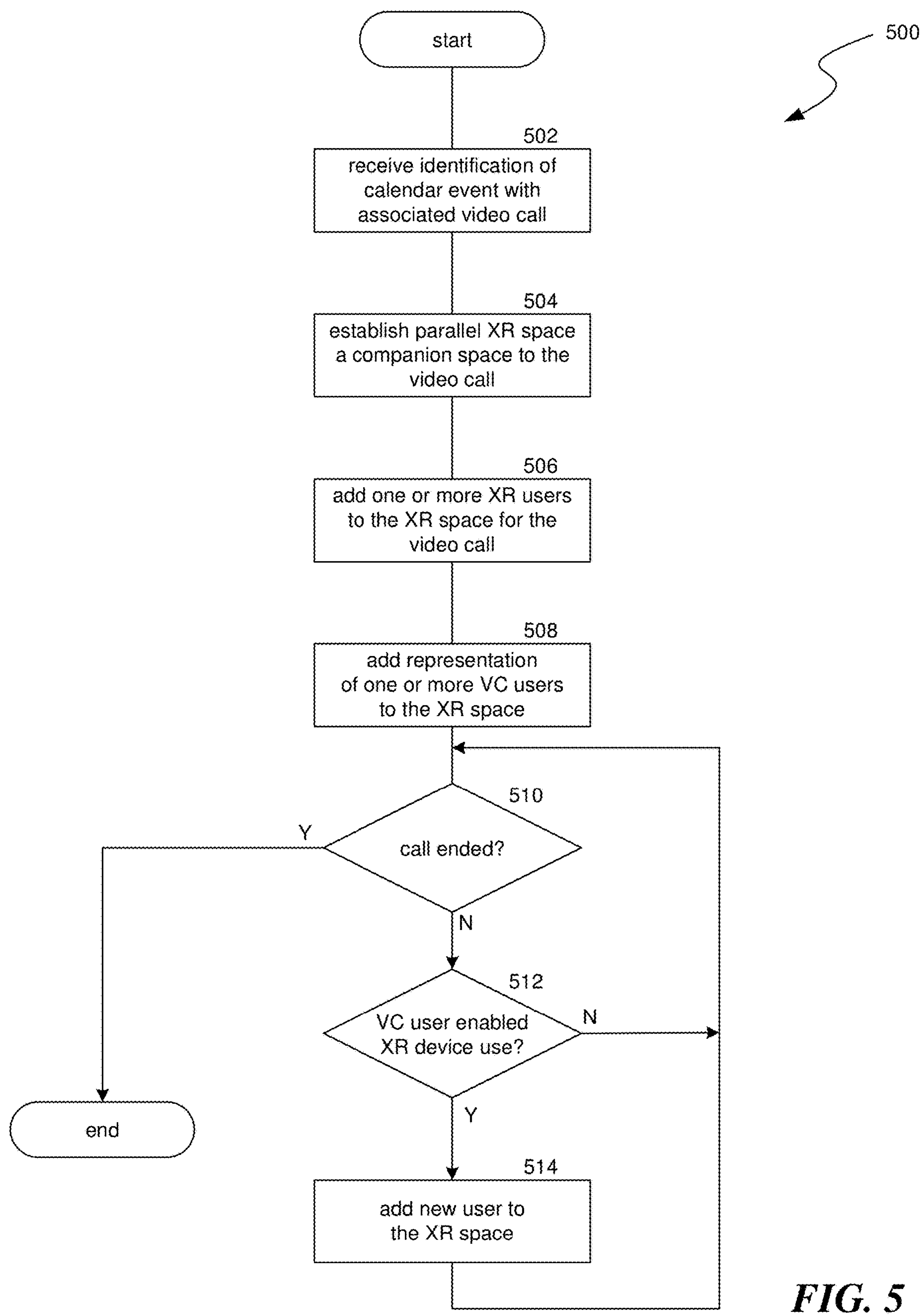
FIG. 5 is a flow diagram illustrating a process used in some implementations of the present technology for establishing and administering an XR space as a parallel platform for a video call.

FIG. 5 is a flow diagram illustrating a process 500 used in some implementations for establishing and administering an XR space as a parallel platform for a video call. In various implementations, process 500 can be performed on an artificial reality device or on a server system that provides services to one or more artificial reality devices. For example, process 500 can execute on a server to create and administer an XR space related to a video call, and process 500 can provide the data for the XR space to the artificial reality devices of invitees of the video call. As another example, process 500 can execute on an artificial reality device, coordinating with a central system or one or more other artificial reality devices to provide a shared XR space to the invitees of a video call.

At block 502, process 500 can receive an identification of a calendar event that has an associated video call. In some cases, this identification can come from a trigger set up for creating calendar events that notifies the VC/XR connection system when an event is created or updated to have a video call (e.g., when the event has a video call link embedded). In other cases, process 500 can have access to a user's calendar (e.g., through the user connecting her calendar to the VC/XR connection system) and this identification can come from process 500 performing a periodic interrogation of the events on the user's calendar to determine if any have embedded video call links. In yet other cases, a user can manually select an event (which may or may not have an embedded video call link) that the user wishes to connect to an XR space. In various cases, such a manual selection may be made through a calendar application on a mobile or desktop device (see e.g., FIG. 6), through a calendar application provided in an artificial reality environment, or through another interface. When interrogating a user's calendar, process 500 can identify events associated with multiple different video call platforms. For example, process 500 can examine the embedded links in each event and determine whether any are mapped to a video call from a variety of video call platforms, e.g., based on a portion of the link, such as its domain name. In some cases, process 500 can also access a list of participants for the identified calendar event. This allows process 500 to provide access to the created XR space (see below) to other video call invitees, whether or not they have linked their calendar to the VC/XR connection system.

At block 504, process 500 can establish a parallel XR space as a companion space to the video call in the identified calendar event. Establishing the XR space can include setting parameters for the XR space based on a context of the calendar event, such as selecting a size (e.g., based on the number of video call invitees), a room layout (e.g., based on user selections or whether the calendar event has presentation materials—signifying the layout should be for a presenter and viewers; or based on how the people attending are connected in a social graph—e.g., to set up a social space for people connected as friends or through a social group and to create a work room or conference room for people connected as co-workers or through a professional organization), and creating a connection mechanism for the VC/XR connection system to link the video call to the XR space. In some implementations, the connection mechanism can be through an API call to the platform of the video call passing parameters of the call. In other cases, the connection mechanism can be set up by using the link provided in the calendar event to have the VC/XR connection system join the video call as a participant. In yet other cases, process 500 can have administrator access to the video call and can add the VC/XR connection system as an invitee to the video call, allowing process 500 to use a link provided to the VC/XR connection system invitee to access the video call.

In various implementations, the XR space can be set up before the video call starts so the XR space is ready to go when video call starts, upon the video call starting, or when a first user associated with video call begins using her artificial reality device. In some cases, process 500 can schedule creation of the XR space to be at, or a specified amount of time (e.g., 5 minutes, 1 minute, 30 seconds, etc.) prior to, the scheduled start time of the video call. This allows process 500 to pre-load the XR space, so participants do not have to wait, while not tying up the resources for the XR space too soon before the call starts. Also in some implementations, the XR space can be set up by a version of process 500 performed for another call participant. In such cases, process 500 can first check if such an XR space is already set up for a given video call, in which case block 504 may be skipped. In some cases, when an XR space is set up, process 500 can notify one or more of the video call participants that the video call will be XR enabled, e.g., by an email or push notification.

In various implementations, blocks 502 and 504 can be performed prior to the beginning of a video call or as the video call starts. Block 506-514 can be performed as the video call progresses. Thus, in some implementations, these can be considered separate processes for setting up the XR space (blocks 502 and 504) and for administering the XR space (blocks 506-514).

At block 506, process 500 can add one or more XR users to the XR space for the video call. When a user enables her artificial reality device, the artificial reality device can check (e.g., based on the invitees determined at block 502), whether the user is an invitee to any video call that is on-going or starting soon (e.g., within 5, 3, or 1 minute). If so, process 500 can automatically add the user to the XR space or provide an option for the user to enter the XR space (see e.g., FIG. 7). When adding a user to an XR space, the user can be represented e.g., as an avatar selected by or for the user or as a holographic representation of the user. Such a holographic representation can be generated by capturing RGB and depth data of a user (e.g., through one or more cameras placed to face the user) and using this data to construct a 3D hologram of the user. Additional details on hologram construction can be found in U.S. patent application Ser. No. 17/360,693, titled Holographic Calling for Artificial Reality, filed Jun. 28, 2021, which is hereby incorporated by reference in its entirety.

When one or more users are in the XR space, process 500 can use the connection mechanism from block 504 to connect to the video call, providing one or more representations of the XR space and/or the users in the XR space as video call participants. In some implementations, this can include showing a feed of the XR space (captured by a virtual camera placed in the XR space) in the video call—as if the XR space was a conference room connected to the video call (see e.g., FIG. 8A). In other cases, the individual feeds of the XR space participants (e.g., captured by a separate virtual camera set up for each XR space participant or by using a hologram feed crated by each artificial reality device) can be added as separate participants in the video call (see e.g., FIG. 8B).

At block 508, process 500 can add a representation of one or more video call users to the XR space. In some implementations, process 500 can add a single representation showing the video call (as it would be seen through a flat panel display—though it may be presented much larger in the XR space—see FIG. 9A). In other implementations, process 500 can create individual panels showing separate representations of the various video call users, which process 500 may place at different locations—such as relative to conference table spaces—in the XR space (see FIG. 9B). In some cases, process 500 may perform modifications to the feeds of the video call users, such as applying a machine learning model trained to convert flat images into 3D images—allowing the panels showing the video call users to appear as if they are windows into a 3D space (i.e., showing perspective and changing depending on the viewing user's angle). Once again, the connection mechanism discussed above in relation to block 504 (e.g., an API call, having the VC/XR connection system be a video call participant, etc.) can allow process 500 access to the video call feeds to be added to the XR space.

At block 510, process 500 can determine whether the video call has ended. If so, process 500 can end. If not, process 500 can continue to block 512 where process 500 can determine whether a new video call user or another video call invitee has enabled her artificial reality device. Determining which user has put on a particular artificial reality device can be based on an account set on the artificial reality device as the primary account or based on which account was last active on the artificial reality device. Determining whether a user that enables her artificial reality device is a participant can be based on the invitee list determined at block 502. If a new user is such an invitee, process 500 can continue to block 514; otherwise process 500 can return to block 510. At block 514, process 500 can add the new user to the XR space. In some cases, process 500 can first offer the user an option e.g., "You have an ongoing, XR enabled call on your calendar. Would you like to enter the XR space for this call?" As discussed above in relation to block 506, adding the user to the XR space can include showing the user as a hologram or avatar in the XR space (as captured by the one or more virtual cameras) which is transmitted to the video call via the connection mechanism. In some cases, when a new user is added to an XR space, a set of places can be established in the XR space (e.g., seats around a virtual conference table) and the user can be placed in the next available space. In some implementations, the user may then be able to select to move to another open spot.

For example, if a user was in the video call but determined that the participants in the XR space were communicating more effectively, this video call user may put on her artificial reality device and, because she is a video call invitee, can be automatically taken to the XR space. An avatar representation of the new user can be presented in the XR space—which may be controlled by having it mirror monitored movements of the user (e.g., head, arms, body, lip syncing, etc.) The newly added user can then continue to participate in the video call from the XR space. Upon adding a video call user to the XR space and being represented in the video call from the XR space, process 500 may cause the user's previous feed into the video call to end. Following block 514, process 500 can return to block 510 to continue the loop while the video call continues.

Figure 6:
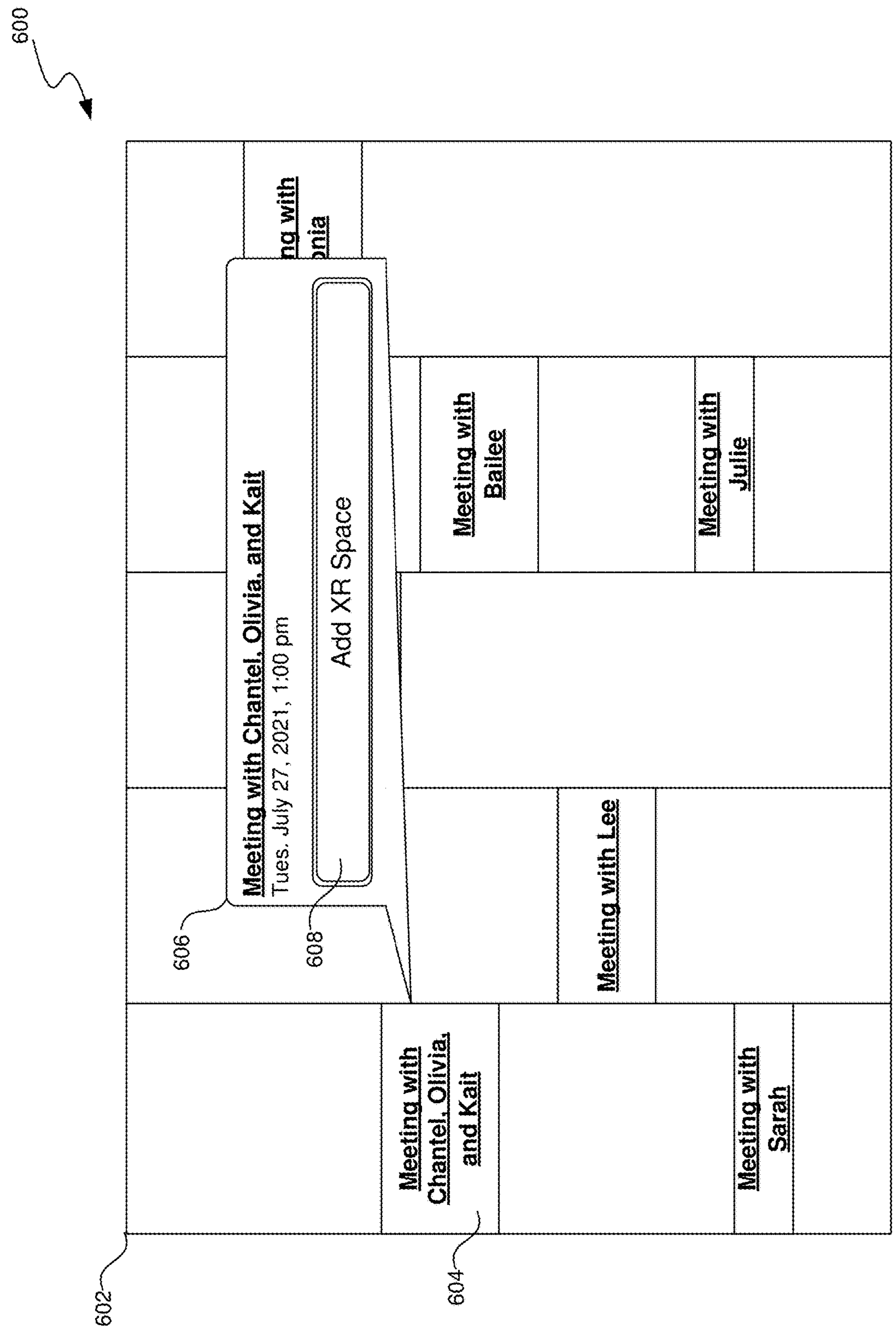
FIG. 6 is a conceptual diagram illustrating an example of a user interface to manually add an XR space to a calendar event associated with a video call.

FIG. 6 is a conceptual diagram illustrating an example 600 of a user interface to manually add an XR space to a calendar event. Example 600 shows a calendar view 602, as it might be displayed on a desktop or in a panel in an artificial reality environment. Upon selecting an event, such as event 604, the VC/XR connection system displays details 606 which can include a control 608. When the user activates control 608, the VC/XR connection system can create the XR space for this event (or schedule it to be created near the time of the event) which can also be connected to any video call associated with the event. Invitees to the event can be automatically taken to this XR space when they use their artificial reality device during the scheduled event.

Figure 7:
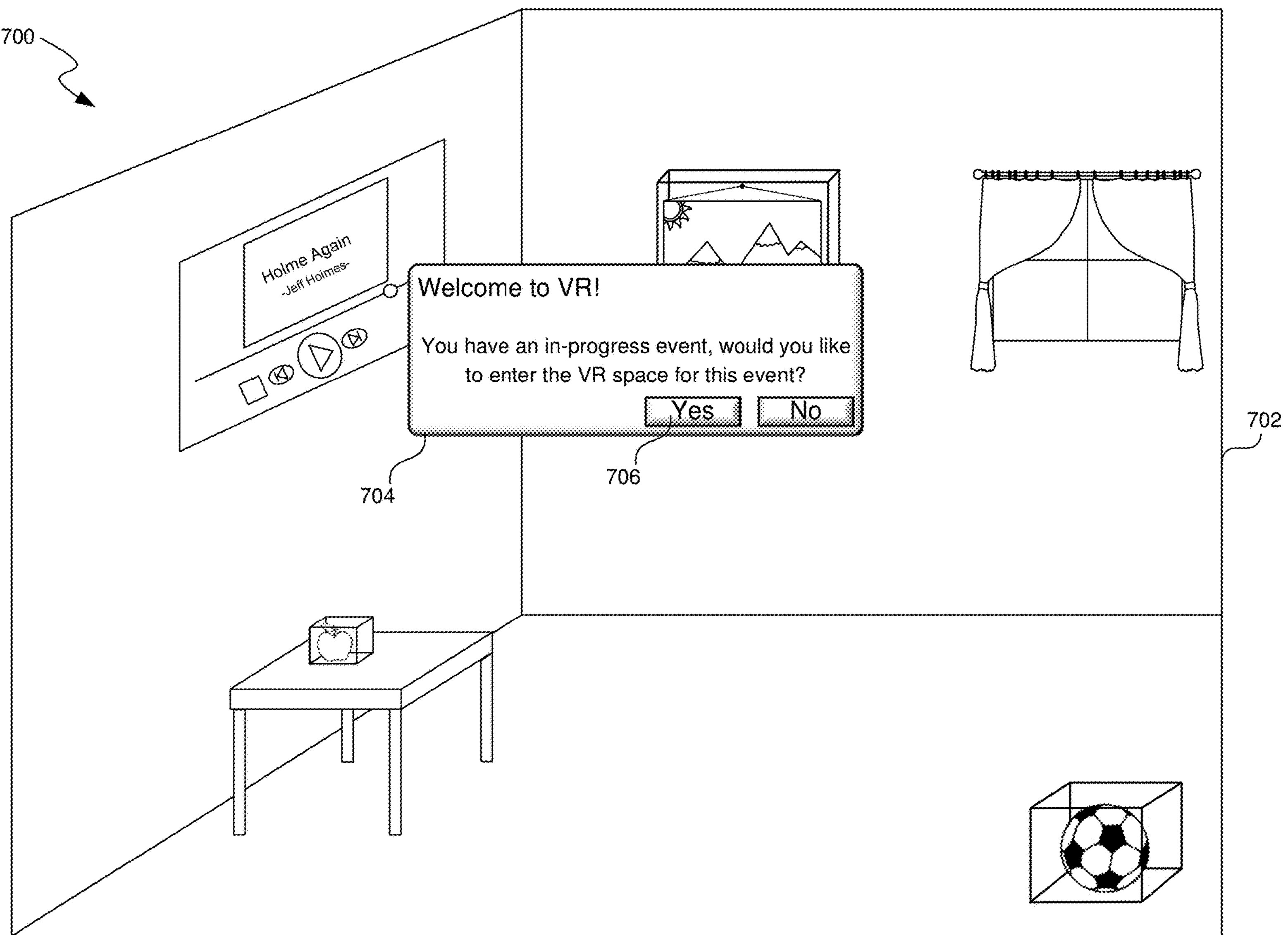
FIG. 7 is a conceptual diagram illustrating an example of providing an option to enter an XR space established for an ongoing video call.

FIG. 7 is a conceptual diagram illustrating an example 700 of providing an option to enter an XR space established for an ongoing video call. In example 700, a user has just put on her artificial reality device and has been taken to her home environment 702. The artificial reality device has determined that the user is an invitee for an event, that has started, for which an XR space has been created. The artificial reality device provides a notification 704 to the user of the availability of this XR space for her event. Upon the user activating control 706, the VC/XR connection system automatically takes the user to the XR space for the event.

Figure 8A:
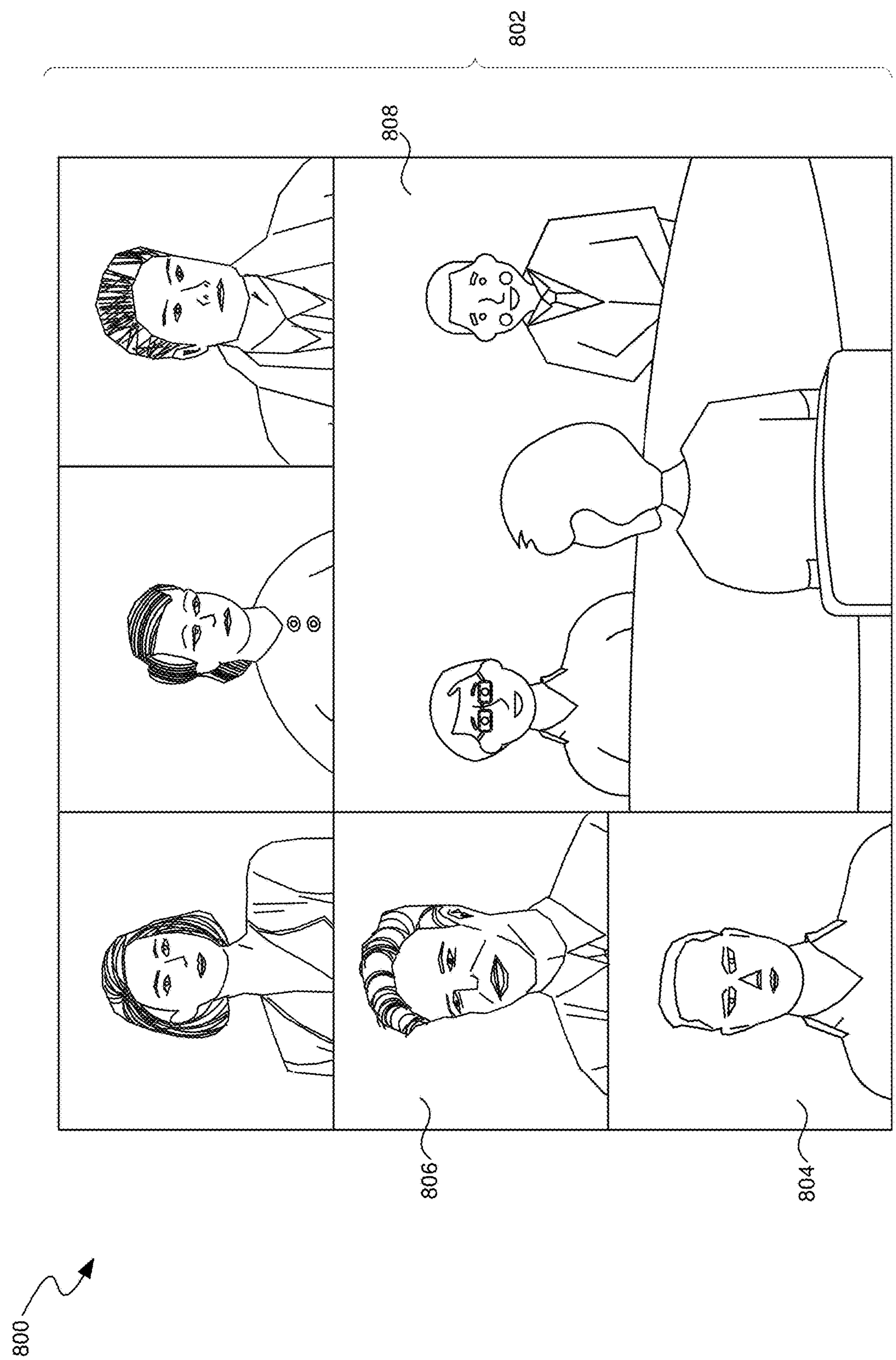
FIG. 8A is a conceptual diagram illustrating an example of a video call with a view into a parallel XR space.

FIG. 8A is a conceptual diagram illustrating an example 800 of a video call with a view into a parallel XR space. In example 800, the video call has a display 802 including a number of traditional video call feeds, such as feeds 804 and 806, and a feed 808 provided from a virtual camera in an XR space. In example 800, the feed 808 is presented as larger than the other video call feeds as this feed is capturing a conference room-like space showing multiple participants.

Figure 8B:
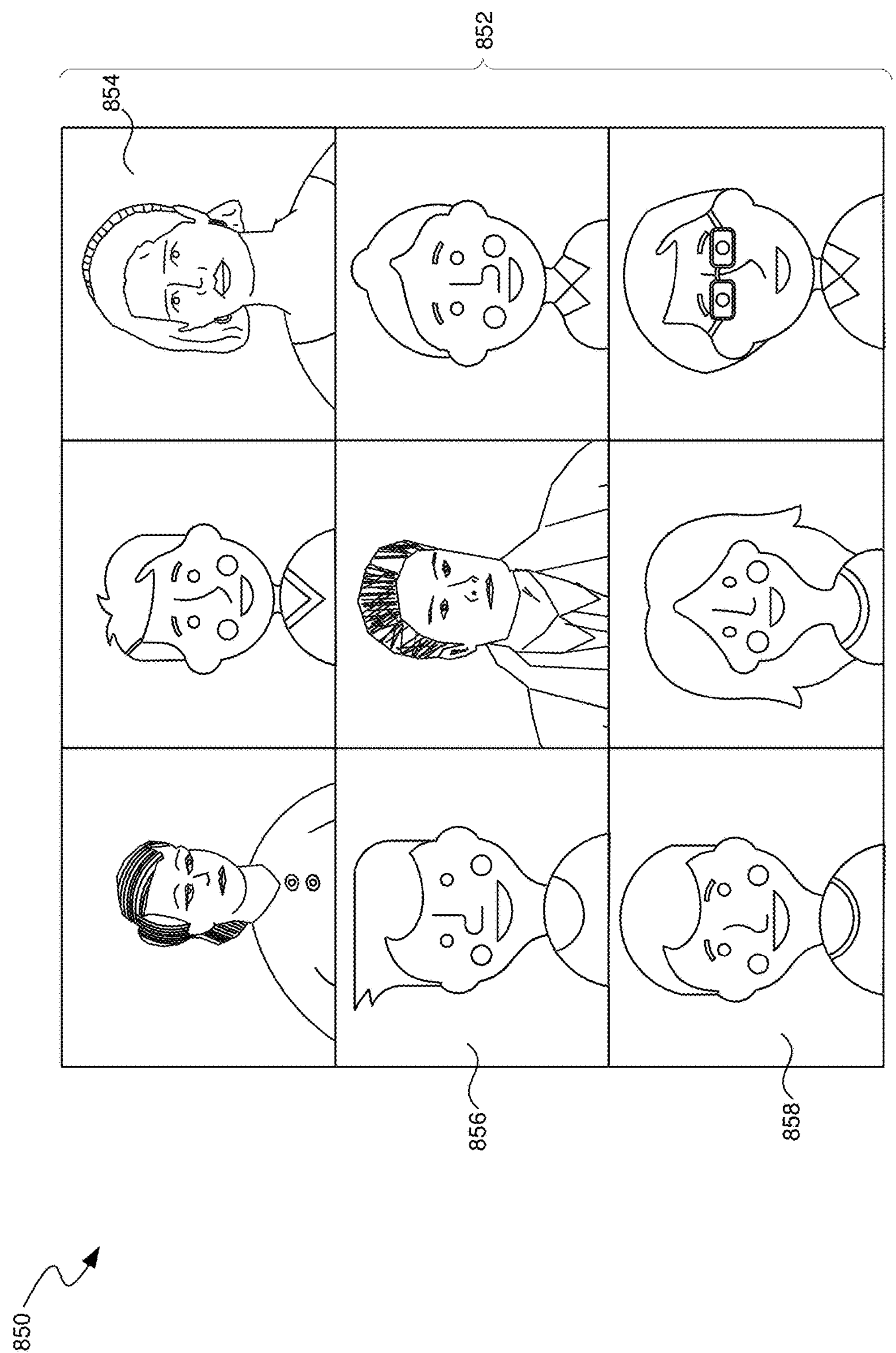
FIG. 8B is a conceptual diagram illustrating an example of a video call with multiple views, into a parallel XR space, one for each participant in the parallel XR space.

FIG. 8B is a conceptual diagram illustrating an example 850 of a video call with multiple views, into a parallel XR space, one for each participant in the parallel XR space. In example 850, the video call has display 852 with a grid showing individual views of both traditional video call participants, such as view 854, and views of participants in the parallel XR space, such as views 856 and 858. Each of the views of the participants that are in the XR space are captured by a corresponding virtual camera placed in the XR space and directed to one of the XR space participants. For example, where the XR space participants are represented by avatars in the XR space, the views of these participants in the video call show a capture of these avatars.

Figure 9A:
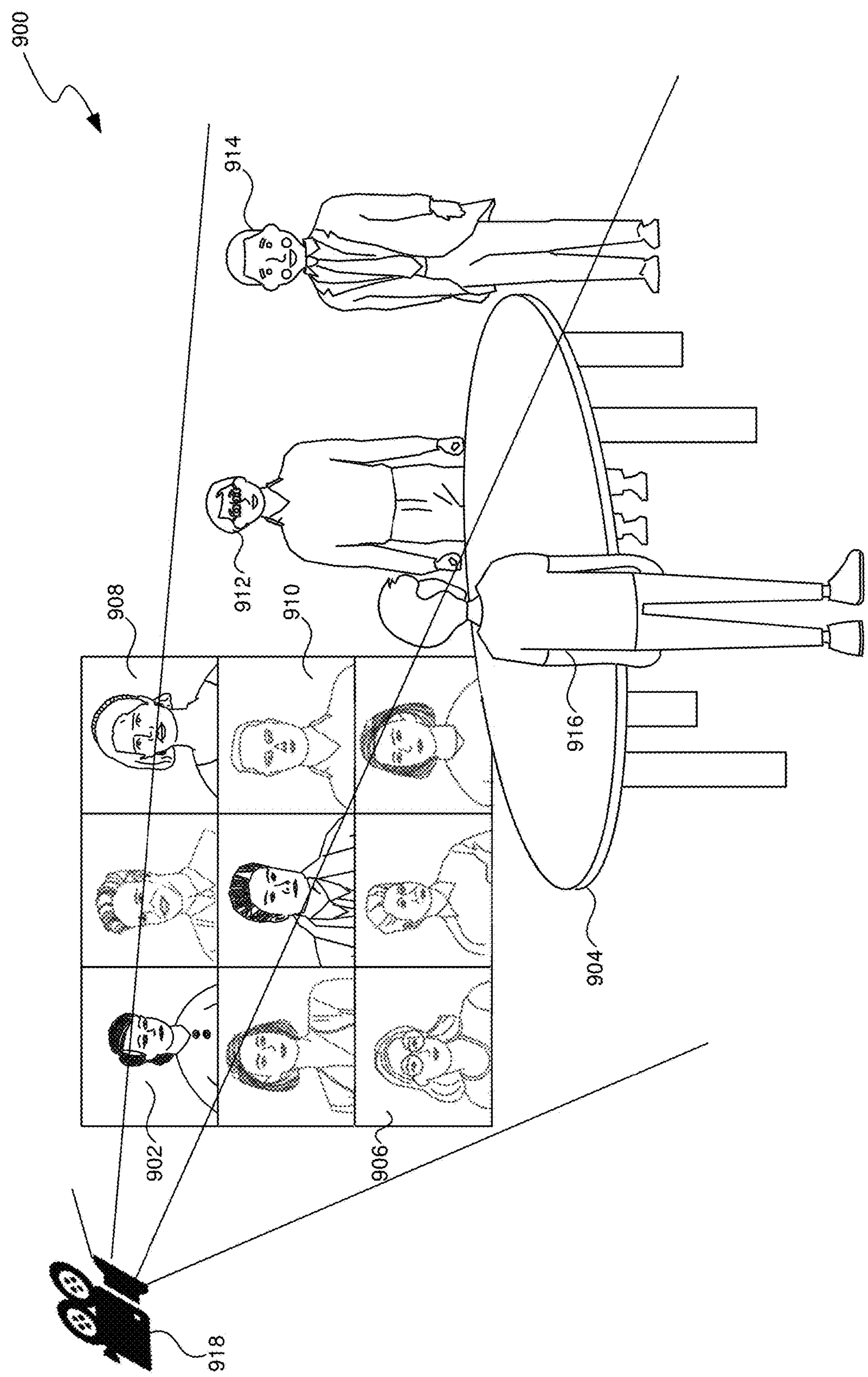
FIG. 9A is a conceptual diagram illustrating an example of an XR space with a single feed from a video call, displayed as a virtual wall element showing multiple participants from a video call.

FIG. 9A is a conceptual diagram illustrating an example 900 of an XR space with a single feed from a video call, displayed as a virtual wall element 902 showing multiple participants from a video call, such as participants 906-910. In example 900, a video call feed 902 is displayed in an artificial reality environment, set up as a parallel XR space for the video call, along with a virtual conference table 904. Participants of the video call joining through the traditional video call interface are presented in the video call feed 902, showing individual video call participants, such as participants 906-910. Participants that have joined the video call through the XR space are shown around the virtual conference table 904, such as participants 912-916. A virtual camera 918 has been placed in the artificial reality environment, capturing a feed of the XR space (as illustrated by the lines emanating from the virtual camera 918), which the VC/XR connection system then provides as input to the video call so the video call participants can see into the XR space (e.g., as shown in FIG. 8A).

Figure 9B:
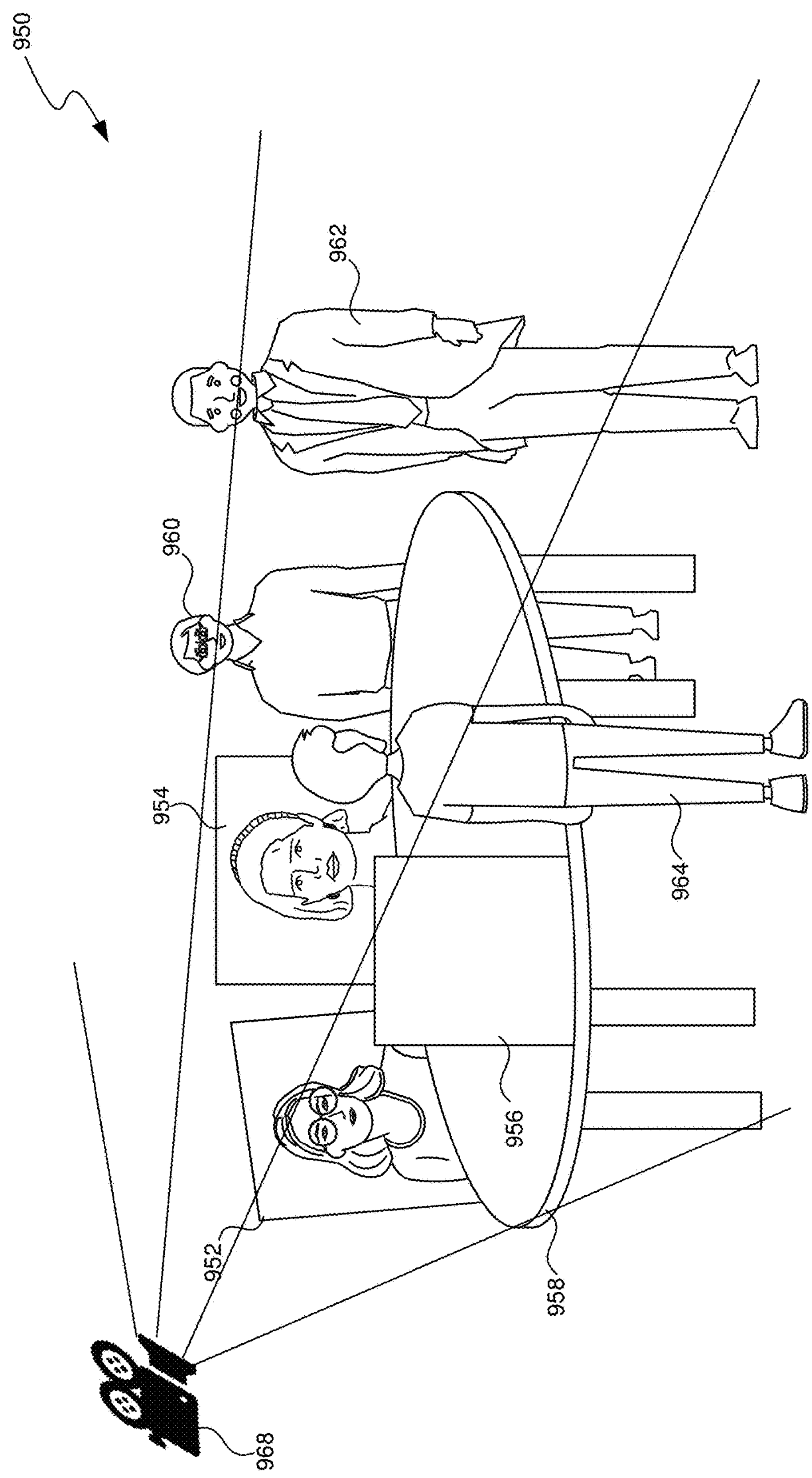
FIG. 9B is a conceptual diagram illustrating an example of an XR space with multiple, separate video feeds, one for each of the participants of a video call.

FIG. 9B is a conceptual diagram illustrating an example 950 of an XR space with multiple, separate video feeds, one for each of the participants of a video call. In example 950, a video call feed has been separated into separate parts 952-956, one for each of the video call participants. The artificial reality environment, set up as a parallel XR space for the video call, includes a virtual conference table 958. Both the feeds 952-956 of the participants of the video call joining through the traditional video call interface and the participants 960-964 that have joined the video call through the XR space are shown around the virtual conference table 958. A virtual camera 968 has been placed in the artificial reality environment, capturing a feed of the XR space (as illustrated by the lines emanating from the virtual camera 958), which the VC/XR connection system then provides as input to the video call so the video call participants can see into the XR space (e.g., as shown in FIG. 8A).

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for establishing and administering an artificial reality (XR) space as a parallel platform for a video call, the method comprising:

establishing the XR space for the video call, wherein one or more XR users, each wearing a head-mounted display of an artificial reality device, join the XR space;

creating a connection mechanism for connecting the XR space to the video call, wherein the XR space provides an XR environment at the same time as the video call;

whereby the one or more XR users view, via that user's artificial reality device, at least portions of the video call; and whereby the one or more video call users view, via that user's computing device, at least portions of the XR space;

providing the portions of the XR space, to be viewable to the one or more video call users, by adding, using the connection mechanism, one or more representations of the one or more XR users to the video call; and providing the portions of the video call, to be viewable to the one or more XR users, by adding, using the connection mechanism, one or more representations of the one or more video call users to the XR space, wherein the adding the one or more representations of the one or more video call users to the XR space includes:

segmenting a single feed, from the video call, into multiple feeds, each showing a representation of one of multiple of the one or more video call users; and arranging the multiple feeds in the XR space according to a defined layout, for participants, of the XR space.

2. The method of claim 1, further comprising receiving an identification of a calendar event associated with the video call, wherein one or more video call users each join the video call, via a computing device, without using a head-mounted display, wherein the receiving the identification of the calendar event includes interrogating events on a calendar, for associations with video calls, by:

reviewing links embedded in two or more of the events on the calendar for link portions that match one of multiple link portions, each defined for one of multiple video call platforms.

3. The method of claim 1, further comprising receiving an identification of a calendar event associated with the video call, wherein one or more video call users each join the video call, via a computing device, without using a head-mounted display, wherein the receiving the identification of the calendar event includes using calendar access permissions to interrogate events, on a calendar, for associations with video calls.

4. The method of claim 1, further comprising receiving an identification of a calendar event associated with the video call, wherein one or more video call users each join the video call, via a computing device, without using a head-mounted display, wherein the receiving the identification of the calendar event includes receiving a user's manual selection of the calendar event for association with the XR space.

5. The method of claim 1, wherein establishing the XR space is performed prior to a start time identified for the calendar event.

6. The method of claim 1, wherein establishing the XR space for the video call includes selecting a size for the XR space based on a determined number of invitees for the video call.

7. The method of claim 1, wherein establishing the XR space for the video call includes selecting a layout for the XR space based on contextual factors of the calendar event.

8. The method of claim 1 further comprising:

identifying, after the video call has begun, that a new user, who was invited to the video call, has enabled an artificial reality device and, in response:

automatically adding the new user to the XR space.

9. The method of claim 1, wherein the connection mechanism is based on an invite link; and wherein the connection mechanism is set up by:

adding a system, for an artificial reality device, as an invitee to the video call, and causing the system for the artificial reality device to receive the invite link, wherein the invite link is configured for the system for the artificial reality device.

10. The method of claim 1, wherein the connection mechanism is based on an invite link provided in the calendar event.

11. The method of claim 1, wherein the adding the one or more representations of the one or more XR users to the video call includes:

adding a virtual camera to the XR space; and providing a feed from the virtual camera to a video call platform, causing the video call platform to show the feed from the virtual camera as a participant in the video call.

12. The method of claim 1, wherein the adding the one or more representations of the one or more XR users to the video call includes:

adding multiple virtual cameras to the XR space, one for each of the one or more XR users added to the XR space; and providing multiple feeds, one from each of the virtual cameras, to a video call platform, causing the video call platform to show each of the multiple feeds as a participant in the video call.

13. The method of claim 1, wherein the adding the one or more representations of the one or more video call users to the XR space includes:

adding a single feed, from the video call, as a virtual element in the XR space, wherein the single feed shows representations of multiple of the one or more video call users.

14. A non-transitory computer-readable storage medium storing instructions that, when executed by a computing system, cause the computing system to perform a process for establishing and administering an artificial reality (XR) space as a parallel platform for a video call, the process comprising:

establishing the XR space for the video call, wherein one or more XR users, each wearing a head-mounted display of an artificial reality device, join the XR space;

creating a connection mechanism for connecting the XR space to the video call, wherein the XR space provides an XR environment at the same time as the video call;

whereby the one or more XR users view, via that user's artificial reality device, at least portions of the video call; and whereby the one or more video call users view, via that user's computing device, at least portions of the XR space;

providing the portions of the XR space, to be viewable to the one or more video call users, by adding, using the connection mechanism, one or more representations of the one or more XR users the video call; and providing the portions of the video call, to be viewable to the one or more XR users, by adding, using the connection mechanism, one or more representations of the one or more video call users to the XR space, wherein the adding the one or more representations of the one or more video call users to the XR space includes:

segmenting a single feed, from the video call, into multiple feeds, each showing a representation of one of multiple of the one or more video call users; and arranging the multiple feeds in the XR space according to a defined layout, for participants, of the XR space.

15. The non-transitory computer-readable storage medium of claim 14, wherein the process further comprises receiving an identification of a calendar event associated with the video call, wherein one or more video call users each join the video call, via a computing device, without using a head-mounted display, wherein the receiving the identification of the calendar event includes interrogating events on a calendar, for associations with video calls, by:

reviewing links embedded in two or more of the events on the calendar for link portions that match one of multiple link portions, each defined for one of multiple video call platforms.

16. The non-transitory computer-readable storage medium of claim 15, wherein the adding the one or more XR users to the video call includes:

adding a virtual camera to the XR space; and providing a feed from the virtual camera to a video call platform, causing the video call platform to show the feed from the virtual camera as a participant in the video call.

17. A computing system for establishing and administering an artificial reality (XR) space as a parallel platform for a video call, the computing system comprising:

one or more processors; and one or more memories storing instructions that, when executed by the one or more processors, cause the computing system to perform a process comprising:

receiving an identification of a calendar event associated with the video call, wherein one or more video call users each join the video call, via a computing device, without using a head-mounted display;

in response to the identification of the calendar event, establishing the XR space for the video call, wherein one or more XR users, each wearing a head-mounted display of an artificial reality device, join the XR space;

accessing a connection mechanism for connecting the XR space to the video call, wherein the XR space provides an XR environment at the same time as the video call;

whereby the one or more XR users view, via that user's artificial reality device, at least portions of the video call; and whereby the one or more video call users view, via that user's computing device, at least portions of the XR space;

providing the portions of the XR space, to be viewable to the one or more video call users, by adding, using the connection mechanism, one or more representations of the one or more XR users to the video call; and providing the portions of the video call, to be viewable to the one or more XR users, by adding, using the connection mechanism, one or more representations of the one or more video call users to the XR space, wherein the adding the one or more representations of the one or more video call users to the XR space includes:

segmenting a single feed, from the video call, into multiple feeds, each showing a representation of one of multiple of the one or more video call users; and arranging the multiple feeds in the XR space according to a defined layout, for participants, of the XR space.

18. The computing system of claim 17, wherein the process further comprises:

identifying, after the video call has begun, that a new user who was invited to the video call has enabled an artificial reality device and, in response:

automatically adding the new user to the XR space.

19. The computing system of claim 17, wherein the connection mechanism is based on an invite link; and wherein the connection mechanism is set up by:

adding a system, for an artificial reality device, as an invitee to the video call, and causing the system for the artificial reality device to receive the invite link, wherein the invite link is configured for the system for the artificial reality device.

* * * * *